(12) United States Patent
Thompson et al.

(10) Patent No.: US 11,087,144 B2
(45) Date of Patent: Aug. 10, 2021

(54) SYSTEM AND METHOD FOR DETERMINING VEHICLE DATA SET FAMILIARITY

(71) Applicant: Harman International Industries, Incorporated, Stamford, CT (US)

(72) Inventors: Aaron Thompson, Brighton, MI (US); Honghao Tan, Brighton, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 169 days.

(21) Appl. No.: 16/156,357

(22) Filed: Oct. 10, 2018

(65) Prior Publication Data
US 2020/0117912 A1  Apr. 16, 2020

(51) Int. Cl.
| | | |
|---|---|---|
| G06K 9/00 | (2006.01) | |
| G06N 20/00 | (2019.01) | |
| G06T 7/70 | (2017.01) | |
| G06N 3/08 | (2006.01) | |
| B60W 50/00 | (2006.01) | |

(52) U.S. Cl.
CPC ......... *G06K 9/00791* (2013.01); *G06N 20/00* (2019.01); *G06T 7/70* (2017.01)

(58) Field of Classification Search
None
See application file for complete search history.

(56) References Cited

U.S. PATENT DOCUMENTS

| | | | | |
|---|---|---|---|---|
| 5,048,097 A | * | 9/1991 | Gaborski | G06K 9/344 382/156 |
| 8,775,341 B1 | * | 7/2014 | Commons | G10L 15/16 706/20 |
| 9,779,314 B1 | * | 10/2017 | Wendel | G06K 9/00825 |

(Continued)

FOREIGN PATENT DOCUMENTS

CN        103425989 A   * 12/2013

OTHER PUBLICATIONS

Saleemi, I. et al., "Scene Understanding by Statistical Modeling of Motion Patterns," Proceedings of the 2010 IEEE Computer Society Conference on Computer Vision and Pattern Recognition, Jun. 13, 2010, San Francisco, California, 8 pages.

(Continued)

*Primary Examiner* — Mohammed Rachedine
(74) *Attorney, Agent, or Firm* — McCoy Russell LLP (57) ABSTRACT

The present disclosure relates to systems, devices and methods for identifying objects and scenarios that have not been trained or are unidentifiable to vehicle perception sensors or vehicle assistive driving systems. Embodiments are directed to using a trained vehicle data set to identify target objects in vehicle sensor data. In one embodiment, a process is provided that includes running a scene detection operation on vehicle to derive a vector of target object attributes of the vehicle sensor data and generating a vector representation for the scene detection operation and the attributes of the (Continued)

vehicle sensor data. The vector representation compared to a familiarity vector to represent effectiveness of the scene detection operation. In addition, the vector representation can be scored to identify one or more target objects or significant scenarios, including unidentifiable objects and/or driving scenes, scenarios for reporting.

20 Claims, 5 Drawing Sheets

(56) References Cited

U.S. PATENT DOCUMENTS

| | | | |
|---|---|---|---|
| 10,572,963 B1* | 2/2020 | Cinnamon | G06K 9/46 |
| 2011/0200230 A1* | 8/2011 | Luke | G06K 9/00791 |
| | | | 382/103 |
| 2015/0055834 A1* | 2/2015 | Zou | G06K 9/00302 |
| | | | 382/118 |
| 2019/0012551 A1* | 1/2019 | Fung | G06K 9/4652 |

OTHER PUBLICATIONS

Tsahalis, J. et al., "Enhances Objet Detection and Classification for Improved Advanced Driver Assistance Systems (ADAS)," Proceedings of the 4th International Conference on Experiments/Process/System Modeling/Simulation/Optimization, Jul. 6, 2011, Athens, Greece, 8 pages.

Kwon, E. et al., "Scene Modeling-based Anomaly Detection for Intelligent Transport System," Proceedings of the 2013 4th International Conference on Intelligent Systems, Modelling and Simulation, Jan. 29, 2013, Bangkok, Thailand, 6 pages.

Das, A. et al., "Optical Flow Based Anomaly Detection in Traffic Scenes," Proceedings of the 2017 IEEE International Conference on Computational Intelligence and Computing Research (ICCIC 2017), Dec. 14, 2017, Coimbatore, India, 7 pages.

* cited by examiner

SYSTEM AND METHOD FOR DETERMINING VEHICLE DATA SET FAMILIARITY

CROSS-REFERENCE TO RELATED APPLICATIONS

This application is concurrently filed with U.S. application Ser. No. 16/156,366, entitled SYSTEM AND METHOD FOR EVALUATING A TRAINED VEHICLE DATA SET FAMILIARITY OF A DRIVER ASSISTANCE SYSTEM filed on Oct. 10, 2018, the disclosure of which is hereby expressly incorporated by reference.

FIELD

The present disclosure relates to systems, methods and devices for assistive and autonomous driving and more particularly to identifying significant data.

BACKGROUND

Vehicle systems are being developed to provide assistance with operation of a vehicle. The systems can include providing feedback and vehicle control. There exists a need for systems and processes to accurately identify data that is important to vehicle detection systems. Many of the existing systems collect large amounts of data which is hard utilize. By way of example, a vehicle system including multiple sensors may generate a vast amount of data during operation. Because existing systems typically generate and store data indiscriminately, there is a significant cost associated storage and maintaining data. In addition to processing, these systems require large scale data storage capabilities. Drawbacks of these systems can include not being able to handle data efficiently, cost for storing data, and difficulty in identifying data of relevance. Existing systems do not provide configurations to interpret significant data. As a result, existing systems may be hampered by data that is stored and not useful. There exists need to improve configurations of vehicle systems for assisted driving and to identify data of significance.

BRIEF SUMMARY OF THE EMBODIMENTS

Disclosed and claimed herein are methods, devices and systems for vehicle perception system operations. One embodiment is directed to identifying significant scenario data by a control unit of a vehicle. The method includes receiving, by a control unit, vehicle sensor data captured by at least one sensor of the vehicle. The vehicle sensor data is generated by a driver assistance system of a vehicle. The method also includes running, by the control unit, a scene detection operation on the vehicle sensor data using a trained vehicle data set to identify target object attributes of the vehicle sensor data. The method also includes generating, by the control unit, a vector representation for the scene detection operation and the attributes of the vehicle sensor data, wherein the vector representation is a representation of effectiveness of the scene detection operation in identifying target object attributes of the vehicle sensor data. The method also includes identifying, by the control unit, significant scenario data based on the vector representation, wherein the significant scenario identifies at least one target object of the vehicle sensor data.

In one embodiment, the vehicle sensor data includes at least one of image, radar, and LiDAR data for a detection zone of the driver assistance system of the vehicle.

In one embodiment, running the scene detection operation on the vehicle sensor data generates an annotated data set for target objects in real time based on the attributes of the trained vehicle data set, the trained vehicle data set providing a plurality of object types and object attributes.

In one embodiment, generating the vector representation includes performing a clustering operation for target objects of the vehicle sensor data using the trained vehicle data set to generate a vector data model for the vehicle sensor data, the vector data model characterizing ability of the trained vehicle set to perceive target objects of the vehicle sensor data.

In one embodiment, identifying the significant scenario includes determining that a target object is an unidentified object.

In one embodiment, identifying the significant scenario includes determining that at least one of the trained vehicle data attributes are unable to classify a target object.

In one embodiment, identifying the significant scenario includes determining familiarity of a target object relative to the trained data set based on at least one of the number of target objects, classification of target objects, size and shape of target object, object type, and object color.

In one embodiment, identifying the significant scenario includes determining at least one vehicle operation characteristic as an attribute relative to identification of a target object in at least one of a driver assistance system and autonomous driving system.

In one embodiment, identifying the significant scenario includes determining familiarity of a current scene the vehicle drives through relative to the vehicle trained data set for a driving condition.

In one embodiment, the method further includes scoring, by the control unit, the vector representation on the ability of the scene detection operation to perceive target object attributes of the vehicle sensor data using the trained vehicle data set, and wherein the significant scenario is identified data based on a score of the vector representation below a predetermined threshold.

In one embodiment, the method further includes outputting the at least one target object of the vehicle sensor data.

Another embodiment is directed to a vehicle control unit including an input configured to receive vehicle sensor data, and a control unit coupled to the input. The control unit is configured to receive vehicle sensor data captured by at least one sensor of the vehicle, the vehicle sensor data generated by a driver assistance system of a vehicle. The control nit is also configured to run a scene detection operation on the vehicle sensor data using a trained vehicle data set to identify target object attributes of the vehicle sensor data. The control unit is also configured to generate a vector representation for the scene detection operation and the attributes of the vehicle sensor data, wherein the vector representation is a representation of effectiveness of the scene detection operation in identifying target object attributes of the vehicle sensor data. The control unit is also configured to identify significant scenario data based on the vector representation, wherein the significant scenario identifies at least one target object of the vehicle sensor data.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to identifying significant data detected by a vehicle system, and in particular assistive or autonomous driving systems. In one embodiment, identifying significant data includes identifying data that is unfamiliar to an existing configuration for detecting objects. Otherwise stated, systems, configurations and processes are provided to identify at least one of an object, object attribute, and scenario perceived by a vehicle system which is underrepresented or brand new in the trained data set. Identifying significant and/or underrepresented data is one exemplary use of the configurations and operations discussed herein. Embodiments are also directed to detection and characterization of anomalies in vehicle data sets. As used herein, one or more anomalies may be determined with respect to vehicle sensor data using a trained vehicle data set. In some instances, a trained vehicle data set is not able to identify or classify a detected object. By way of example, one or more vehicle sensors may provide output identifying the presence and/or location of an object where the object may not match or be represented by an object type of the trained data set. In other embodiments, vehicle sensor data may conflict with respect to a detected object. Failure to identify or classify an object may be based on insufficient data or parameters of a trained data set used by the vehicle to perceive a scene.

As used herein, assistive driving may refer to at least one of providing an indication, capturing data, controlling operation of a vehicle, activating a vehicle system and vehicle control operations in general for driver and/or driverless controlled vehicles. Assistive driving may relate to one or more functions of an advanced driver assistance system (ADAS) or autonomous driving (AD) system. Assistive driving operations may include lane change assist, parking assist, braking control, etc. Assistive driving may also refer to systems and operations for autonomous driving systems and vehicles. An assistive driving system can relate to a vehicle system including at least one sensor to detect objects or vehicle operating conditions, a control unit and one or more vehicle systems to control the vehicle. Object and vehicle data may be determined from at least one sensor, including but not limited to an image sensor (e.g., video), radar sensor, LiDAR sensor, acceleration/motion sensor and vehicle sensors (e.g., wheel speed sensor, tire pressure monitoring system (TPMS) sensor, ABS sensor, yaw/pitch sensor, stability control sensor, etc.). According to one embodiment, assistive driving systems may operate using baseline data, such as a trained data set to detect target objects (e.g., other vehicles, lane markers, barriers, etc.), driving conditions (e.g., a braking condition, vehicle sliding, distance to other vehicles/objects, etc.) and/or scenarios. The baseline data may include one or more recognized object types and object attributes. The baseline data can also include scenario data for objects and object arrangement. For example, patterns of lane markers may be detected to signal a lane merger or bend in a road. As will be discussed herein, objects, object attributes, and scene data may be part of a scenario which may be identified and characterized. Systems, methods and configurations described herein, can include vehicle systems for real-world deployment in various conditions or scenes (e.g., day, night, low-light, weather related, etc.). In addition, systems and methods may be performed during run time (e.g., while the program is being executed) for in-vehicle use.

According to another aspect of the disclosure, embodiments are directed to event capture and operations for analyzing vehicle sensor data. One issue for a vehicle system that captures large amounts of data is identifying data that is significant. Embodiments are directed to incorporating the significant data into a trained vehicle data set. Data of significance may be used to determine capture events and data segments, enhance the similarity of a baseline data set to the real world, and determining whether scene data detected overall is valid.

In one embodiment, processes include generating a vector representation of trained data set or annotated baseline data. In other embodiments, processes include generating a vector representation of vehicle sensor data. Vector representations may be based on model data of the system and may be used to determine effectiveness of the system in identifying objects using a trained data set and/or effectiveness of the trained data set. Generating a vector representation may include performing one or more operations by a vehicle controller. In one embodiment, vector representation allows for an anomaly vector to be determined. The anomaly vector may be used to identify objects or scenarios that are of significance to the system.

In one embodiment, processes include comparing a vector representation of trained data set, such as a familiarity vector, to a vector derived for target object attributes detected from at least one perception sensor of a vehicle.

According to one embodiment vector representations may be employed for determining a significant scenario based on vector representations of object type, object attributes, object patterns, and scenes. By way of example, vector representations of the object type may identify an object that does not match or cannot be identified with parameters of the data set for identifying an object. In one embodiment, object attributes may be significant, where a target object is detected and is classified as an object. The target object may include one or more attributes that are identified and not adequately handled by a control device, accordingly the one or more attributes may be significant. In another embodiment, vector representations of object patterns, such as lane markers, parking situation patterns, braking patterns for stop and go traffic, etc., may be handled by a vector representation for the pattern. Situations which differ from patterns of the data set, or driving situations including a pattern and then a divergence from the pattern may be identified as significant. One or more vector representations may be derived for target object attributes from vehicle sensor data. Vector representations may be generated for a scene based on one or more parameters. For a driving scene that is relative to other objects, such as other vehicles, movement of the other vehicles and the vehicle including a control unit may be detected to identify significant scenarios for the vehicle including a control unit, such as a traffic pattern the vehicle is not properly trained to handle. Alternatively, scenarios may relate to driving conditions based on weather (e.g., rain, snow, fog, etc.), road condition (e.g., paved, unpaved, low traction, etc.), lighting conditions (e.g., low light, and operating scenarios for a vehicle.

According to one embodiment, identifying a significant scenario includes identifying at least one target object. The target object may be significant if vehicle trained data is not sufficient to characterize or determine the type of object detected. A target object may be significant if one or more attributes of the trained vehicle data does not adequately identify an object. Significant scenarios may be detected based on vehicle operation.

According to another embodiment, a significant scenario may be identified by comparing a vector representation for a scene detection operation with a familiarity vector of a trained data set, such as a vehicle trained data set.

According to one embodiment, identifying a significant scenario includes detecting one or more vehicle operating conditions. Vehicle operating conditions may be determined based on vehicle data, such as loss of traction or rapid deceleration events (e.g., braking event) using vehicle data. In other embodiments, vehicle operating conditions may be relative to identified objects. By way of example, detection of an object, such as a vehicle traveling in the same direction or in front of a vehicle, may be used to for detection of scenario.

According to one embodiment, a control unit of a vehicle is configured to identify significant scenario data. Processes and device configurations are provided to identify significant scenario data detected from one or more vehicle sensors. As such, significant vehicle data may be detected during runtime. In addition, vehicle training data and the ability of a vehicle system to detect objects and driving configurations may be evaluated. In one embodiment a vehicle control unit includes at least one input configured to receive vehicle sensor data, and a control unit coupled to the input. The control unit may be part of a vehicle control system, such as an assistive driving unit or autonomous driving module. The control unit may be configured to receive vehicle sensor data and perform one or more operations to evaluate a scene associated with a vehicle and/or one or more operating characteristics. As will be discussed in more detail below, the control unit may employ a vector representation to process attributes of the vehicle sensor data.

Processes and device configurations described herein can avoid reporting data that is easily handled by the system. Reporting significant data, such as an object of significance, is preferable to limit the data that has to be processed to evaluate a vehicle trained data set. The processes and device configurations described herein allow for a vehicle control unit to identify significant or relevant objects and capture of data for further analysis. These operations may allow for a vehicle assistance system to continually approach a desired data set of parameters while limiting and/or eliminating the need for manual review.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1A:
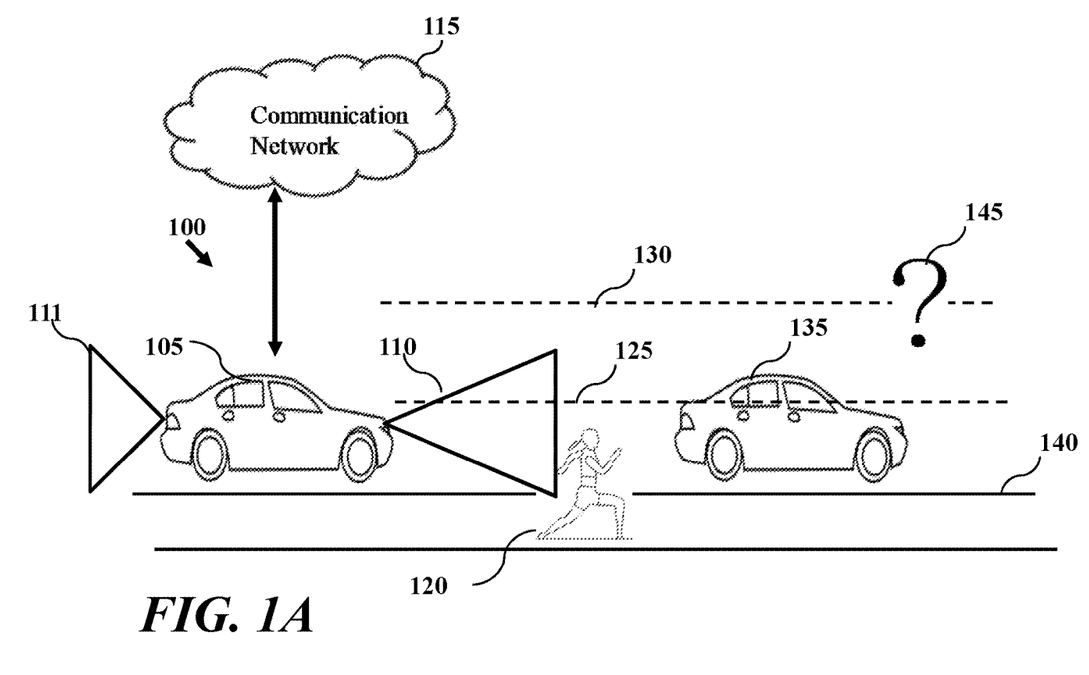
FIGS. 1A-1B depict graphical representations of scenario data according to one or more embodiments.
Figure 1B:
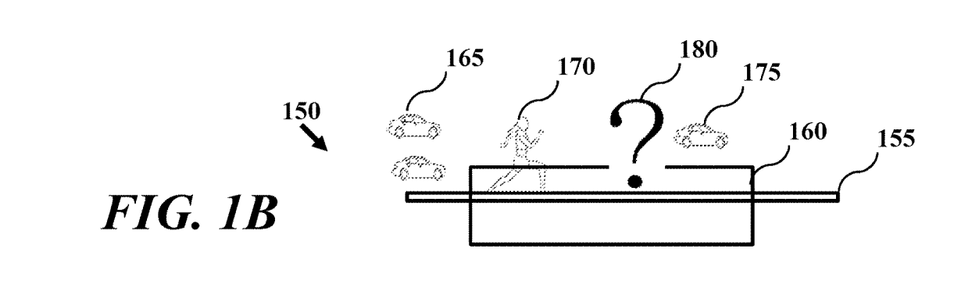

FIGS. 1A-1B depict graphical representations of scenario data according to one or more embodiments. According to one embodiment, systems, configurations and processes described herein are directed to vehicle systems. FIGS. 1A-1B depict graphical representations of an exemplary scenario for a scene 100 associated with vehicle 105 and a plurality of objects. Scene 100 may relate to a particular location or period of time, wherein the presence of objects and/or one of more vehicle characteristics may allow for a sensor of vehicle 105 to detect one or more objects. According to one embodiment, vehicle 105 may include one or more sensors to detect objects based on vehicle trained data. By way of example, for objects present in scene 100, vehicle 105 is configured to interpret vehicle sensor data to detect one or more of the objects. In certain embodiments, vehicle sensor data may be related to one device or one type of device, such as an image sensor (e.g., camera). As such, one or more target objects may be identified by vehicle 105 using vehicle trained data from sensed image data. According to other embodiment, vehicle 105 may include a plurality of sensing devices generating multiple types of sensor output, including one or more of image, proximity sensing, radar, and LiDAR.

Vehicle 105 may be configured to detect and classify a plurality of object types and scenarios, such as braking event or lane shift, using trained vehicle data. Embodiments discussed herein allow for assessing when vehicle trained data sets do not sufficiently allow for detection or handling of target objects. By way of example, vehicle 105 may detect an object, but not be able to identify or determine how to control vehicle 105 in response to the object. Other embodiments allow for assessing the vehicle familiarity with objects using a trained data set. In that fashion, while the embodiments may employ specific sensor types and/or target object attributes, the systems, processes and configuration discussed herein allow for detecting anomalies with one or more different sensor configurations or vehicle training data sets. Moreover, the principles of the disclosure can be applied to different sensor configurations of a vehicle.

FIG. 1A depicts an exemplary scene including objects which may be detected and identified by one or more units, such as a control unit of vehicle 105. In FIG. 1A, scene 100 includes vehicle 105 having one or more detection areas shown as 110 and 111, the detection areas generally referring to a forward direction of travel for detection area 110 and a backward facing direction for detection area 111 of the vehicle 105. Detection areas 110 and 111 are shown relative to one or more directions of vehicle 105 that may be assessed and or accounted for in the trained vehicle data set. According to one embodiment, one or more sensors of vehicle 105 can detect objects relative to the detection areas of the vehicle, including forward, back, and lateral direction areas of the vehicle. Scene 100 may relate to an exemplary scenario, or type of scene of interest to the vehicle. In addition, each scene detected by vehicle 105 may be associated with one or more of the type of object, number of objects, location of objects, movement of objects, etc. According to another embodiment, each scene may be associated with at least one of the operating characteristics of the vehicle, and operating characteristics of other vehicles. According to an exemplary embodiment, scene 100 includes pedestrian 120, lane markers 125 and 130, vehicle 135 and roadway boundary 140.

Vehicle 105 may not only identify a type of target object, such as pedestrian or passenger vehicle, but may also utilize one or more attributes of the object to characterize a target object. Attributes and object types may be stored in annotated baseline data or vehicle trained data that may be utilized by a control unit of vehicle 105 to identify objects and in some cases control vehicle 105. In an exemplary embodiment, vehicle 105 may detect lane markers 125 and 130 and one or more attributes associated with each target. By way of example, vehicle 105 may detect the location, spacing, color, angular diversion, and one or more additional attributes to detect a scenario that may be of interest to the vehicle. In some cases, such as highway driving, vehicle 105 may be trained to detect and handle lane markers 125 and 130 that appear in more or less a straight line for an extended period. Identification of these attributes may be used by an assistive system of vehicle 105 to stay within lane markers 125 and 130. As will be discussed herein, vector representation of sensed vehicle data for target objects, such as lane markers 125 and 130, can be used to identify scenarios where the trained vehicle data is not equipped to handle target objects, such as a sudden departure in positioning of lane markers 125 and 130, or a narrowing of roadway 140. In addition to event capture, configurations are directed to determining when and what type of vehicle sensor data is not adequately included in vehicle trained data. As such, configurations are provided for identifying at least one of a target object of interest, scenario of interest and range of data collected by a vehicle.

In yet another embodiment, configurations are provided to report one or more of a target object and scenario of interest. According to one embodiment, vehicle 105 may be configured to communicate with communication network 115 for data exchange with one or more network resources, such as servers, to share target objects and scenarios. In certain embodiments network resources may be used to provide updates to vehicle trained data used by vehicle 105 in response to reported objects or scenarios.

Another embodiment is directed to minimizing the data reported by vehicle 105. Vehicles configured for assisted or autonomous driving may record vast amounts of data. While vehicle data may be recorded and stored in a vehicle recording device to track vehicle operation, there may be many cases where reporting of vehicle data is unnecessary. For example, reporting may not be necessary when the vehicle 105 can adequately handle the scenario or scene based on a trained vehicle data set. Referring to the highway driving example described above between lane markers 125 and 130 for long stretches (e.g., on the order of mile/km), reporting and later processing of the data and scenario may not be required. In fact, reporting and processing the data post vehicle operation may require large data stores and actual manual labor requiring a financial outlay. In certain situations, there is a need for configurations that do not report vehicle sensor data that is adequately handled.

Another embodiment includes identifying target objects or scenarios that are unknown or not properly classified by a vehicle control unit. By way of example, vehicle 105 may detect several pedestrians, such as pedestrian 120, or several vehicles, such as vehicle 135, wherein attributes of the vehicle trained data set can account for differences in the actual objects while still classifying the objects to the correct object type and/or appropriate object attributes. However, in some instances, vehicle trained data sets may not accurately or adequately identify an object or scenario. FIG. 1A depicts a significant scenario 145 as a question mark, as vehicle sensor data may identify that scenario 145 is associated with a target object or vehicle condition that is not understood using the vehicle trained data set. For example, the trained data set may not understand a target object using the trained data set when one or more of the object, object attribute, and driving condition exceed a degree or threshold relative to a vector representation of the detected sensor data. Operations and configurations discussed herein provide for various unidentified scenarios.

With respect to target objects, scenario 145 may relate to an unidentified object. Described another way, scenario 145 may relate to an object detected by vehicle 105 but unknown to the vehicle. By way of example, if scenario 145 relates to a person dressed in a chicken suit (or other costume for that matter), attributes of the vehicle trained data set used by vehicle 105 may not be able to identify the object, as the chicken suit would likely result in characteristics not including attributes for a pedestrian object type. Or possibly the chicken suit may be associated with object attributes for two different object types resulting in a conflict. Another object type example for scenario 145 may relate to detection of a rare object, such as a monster truck (e.g., vehicle with extremely large tires, and possibly pyrotechnics) that is detected by vehicle 105. Attributes of target object types for vehicles in a trained vehicle set will typically be directed to passenger vehicles, a detected monster truck may be a scenario of interest. Scenarios of interest may be characterized as being worth reporting by vehicle 105. Scenario 145 may relate to vehicle operating characteristics, such as abrupt maneuvering (e.g., sliding, loss of traction) or vehicle control (e.g., braking). During a typical rush hour drive a vehicle operator (or autonomous system) may heavily depress the brakes. In some situations, repeated braking in close proximity to other vehicles may be normal for a particular vehicle during a particular time of day and/or on a particular route/stretch of road. However, in other situations, abrupt or repeated braking or other vehicle operating conditions may be a scenario, such as scenario 145, worth reporting. By way of example, the vehicle trained data set for assistive braking or autonomous driving may not be trained to maintain a proper distance of separation. As such, systems, devices, and vehicle configurations are provided for identifying scenarios of interest relative to a trained vehicle data set.

With respect to object types and scenarios, the principles of the disclosure may also apply to assessing the familiarity of a vehicle assistive driving unit as a whole for various scenarios. Assistive driving systems trained on roadways in pleasant weather conditions may have difficulty when weather or other situations arise. Weather, the presence of snow or other precipitation and even loss of grip may be attributes accounted for assessing vehicle trained data sets.

FIG. 1B illustrates an exemplary segment of objects relative to a timeline. With respect to reporting, a control unit of a vehicle (e.g., vehicle 105) may be configured to report at least one of an object of significance and a segment of data captured by the vehicle. In some cases, reporting a target object may allow for the vehicle to better understand unfamiliar pedestrians, such as a man in a chicken suit. In other instances, reporting all target objects and attributes may be for a period of time preceding and following a target object. FIG. 1B shows scene data 150 relative to a timeline 155 and for a segment 160 of interest. Segment 160 may be identified relative to target objects and attributes identified when reporting. As will be discussed in more detail below, a segment of data, such as vehicle sensor data may be reported in response to a scene detection operation to identify a significant scenario or object. FIG. 1B is an exemplary representation of segment 160, where objects prior to the segment, such as vehicle 165, will be excluded from the reporting. In one embodiment, reporting a segment of object targets includes reporting objects priori to a significant scenario data, such as pedestrian 170 prior to, scenario 180, and objects following the scenario, such as vehicle 175. Embodiments herein allow for reporting simply scenario 180, and/or reporting segment 160 including objects 170 and 175 and scenario 180.

While FIGS. 1A-1B depict an exemplary scene and segment of objects/scenarios that may be detected, embodiments are provided herein for identification of significant data and scenarios.

Figure 2:
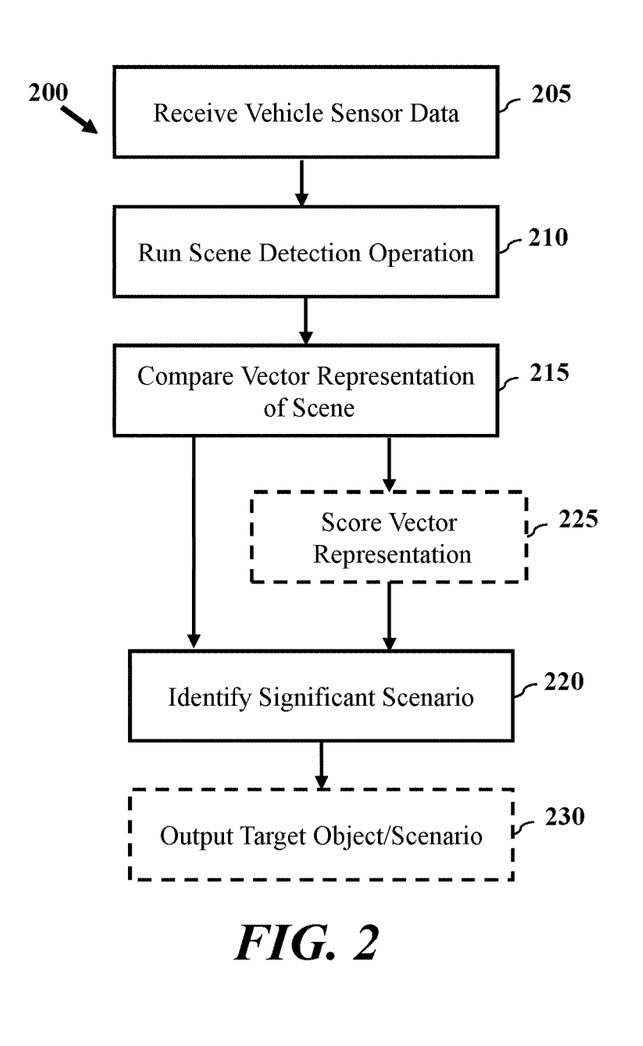
FIG. 2 depicts a process for control unit operation according to one or more embodiments.

FIG. 2 depicts a process for identifying significant scenario data according to one or more embodiments. Process 200 may be performed by a control unit (e.g., control unit 305 of FIG. 3). According to one embodiment, process 200 includes receiving vehicle sensor data captured by at least one sensor of the vehicle at block 205, running a scene detection operation at block 210, and generating a vector representation of a scene at block 215. A significant scenario may be identified at block 220. Process 200 may be performed by a control unit, such as a navigation control unit, of a vehicle. The control unit may be configured to receive positioning data for the vehicle, such as global positioning data (e.g., GPS). The control unit may also store map data for one or more geographic regions associated with vehicle position. In certain embodiments, the control unit is configured to receive roadway information services such as traffic and weather associated with routes of the map data. Roadway and condition information such as weather may be included in one or more attributes of a trained vehicle data set.

According to one embodiment, process 200 may be based on a trained vehicle data set. By way of example, a trained vehicle data set may include an annotated training data set from an advanced driver assistance system (ADAS) or autonomous driving (AD) system with raw sensor data based on several attributes with ground truth. Vehicle sensors can include data for one or more of video, radar, and LiDAR as ground truth used for annotation. Ground truth data provides the system with a perceptible object types and attributes. Process 200 can allow for the extraction and use of a driver assistance system operating parameters (e.g., algorithm, processes, etc.) during runtime to assess familiarity with its own baseline data set to identify and flag for capture an anomaly. This capture would be used to update the training of the run time algorithm in a subsequent release by updating the baseline data set.

At block 205, vehicle sensor data from one or more sensors of the vehicle may be received. By way of example, vehicle sensor data is generated by a driver assistance system of a vehicle, and in particular one or more sensors associated with or included in the driver assistance system. According to one embodiment, vehicle sensor data includes at least one of image, radar, and LiDAR data for a detection zone of the driver assistance system of the vehicle. Vehicle sensor data can also characterize operation of a vehicle and one or more other vehicles relative to the vehicle to include data for driving distance relative to the vehicles, number of vehicles, vehicle type, etc.

At block 210, the control unit runs a scene detection operation on the vehicle sensor data using a trained vehicle data set to identify target object attributes of the vehicle sensor data. In one embodiment, running the scene detection operation on the vehicle sensor data generates an annotated data set for target objects in real time based on the attributes of the trained vehicle data set. By way of example, the scene detection operation not only identifies target objects, but also performs operations to perceive the objects using a trained vehicle data set. The trained vehicle data set can provide a plurality of object types and object attributes. The scene detection operation block 210 can generate a dataset characterizing a scene relative to a vehicle. According to one embodiment, the dataset can be approximated using clustering of the types of data based on the attributes.

According to another embodiment, at block 210, the control unit runs a scene detection operation on the vehicle sensor data to derive a vector of target object attributes of the vehicle sensor data. In one embodiment, the vector of target object attributes characterizes a scene relative to a vehicle including the data generated by at least one perception sensor.

At block 215, the control unit may be configured to compare a vector representation for the scene detection operation with a familiarity vector of a trained data set.

At block 215, the control unit can include generating a vector representation for the scene detection operation and the attributes of the vehicle sensor data. According to one embodiment, the vector representation includes one or more operations to generate a model of the data for the scene, such as a vector space model representing objects in a continuous vector space where similar objects are mapped to nearby points. According to one embodiment, the number of attributes for objects in the trained vehicle set directly correlates to the number of dimensions of the generated vector. Generating the vector representation can include performing a clustering operation for target objects of the vehicle sensor data using the trained vehicle data set to generate a vector data model for the vehicle sensor data. For example, a clustering method such as K-means clustering may be used to approximate the "area" of a collected and annotated data set that is used to train a run time algorithm for scene detection. According to one embodiment, the vector representation is a representation of effectiveness of the scene detection operation in identifying target object attributes of the vehicle sensor data. The vector data model characterizing ability of the trained vehicle set to perceive target objects of the vehicle sensor data.

According to one embodiment, a trained vehicle data set is stored in a data repository, such as a cloud repository, and may be provided to one or more vehicles (e.g., control units). A resultant vector may be generated from the clustering to describe the dataset for performing scene operations. In one embodiment, the vector is generated concurrently with the algorithm release for the run time system.

According to another embodiment, the vector is then used in the run time system to score the scenario based on the attributes of detected target objects. Process 200 may optionally include scoring a vector representation at block 225. According to one embodiment, the control unit can score a vector representation on the ability of the scene detection operation to perceive target object attributes of the vehicle sensor data using the trained vehicle data set. A significant scenario may be identified data based on a score of the vector representation below a predetermined threshold.

At block 220, the control unit can identify significant scenario data based on the vector representation. The significant scenario identifies at least one target object of the vehicle sensor data. According to one embodiment, an anomaly that escapes the clustering described by the vector would trigger a flag in a data collection system that describes an event. Each event may be considered significant to the existing data set since the trained run time algorithm is not familiar with the scenario. The compiled events captured during the capture period are added to the resultant data set and cycled through the training process for the next algorithm release. The new data set is then approximated again to update the clustering.

According to one embodiment, identifying the significant scenario includes determining that a target object is an unidentified object. Objects that are unidentified, such as a person in a chicken suit, monster truck vehicle, or unidentified flying object (e.g., drone, flying objects in general) may be classified as unidentified and reported. In some cases, network resources may review the report object targets or segments. By providing a report of the unidentified object, the reviewing system can focus resources on objects that are unidentifiable using the trained data set.

According to another embodiment, identifying a significant scenario includes determining that at least one of the trained vehicle data attributes are unable to classify a target object. In this scenario, an object may or may not be associated with a target object class; however one or more features or attributes of the target object may not be classified by the trained vehicle data set. Accordingly, object attributes may be added or modified to allow for classifying an object based on a new parameter.

According to another embodiment, identifying the significant scenario includes determining familiarity of a target object relative to the trained data set based on at least one of the number of target objects, classification of target objects, size and shape of target object, object type, and object color. In certain embodiments, attributes may be stored in the trained vehicle data set for a plurality of attributes based on previously detected object targets.

According to another embodiment, identifying the significant scenario includes determining at least one vehicle operation characteristic as an attribute relative to identification of a target object in at least one of a driver assistance system and autonomous driving system. In certain embodiments, attributes are provided in the trained vehicle data set for sensor configurations of the vehicle. In an exemplary embodiment, attributes may be based on a front camera used in vehicle assistance system or autonomous vehicle to bring in data into a central computing platform of the vehicle.

Process 200 may optionally include outputting a target object and/or scenario at block 230. Outputting the significant scenario data can include output of an object, multiple objects, and a segment of data. In certain embodiments, segments of data output may include data for target objects detected in a period preceding and following identification of a significant event. Reporting significant scenario data is an improvement over systems that report all data, especially when a vehicle is operated for an extended period of time.

Figure 3:
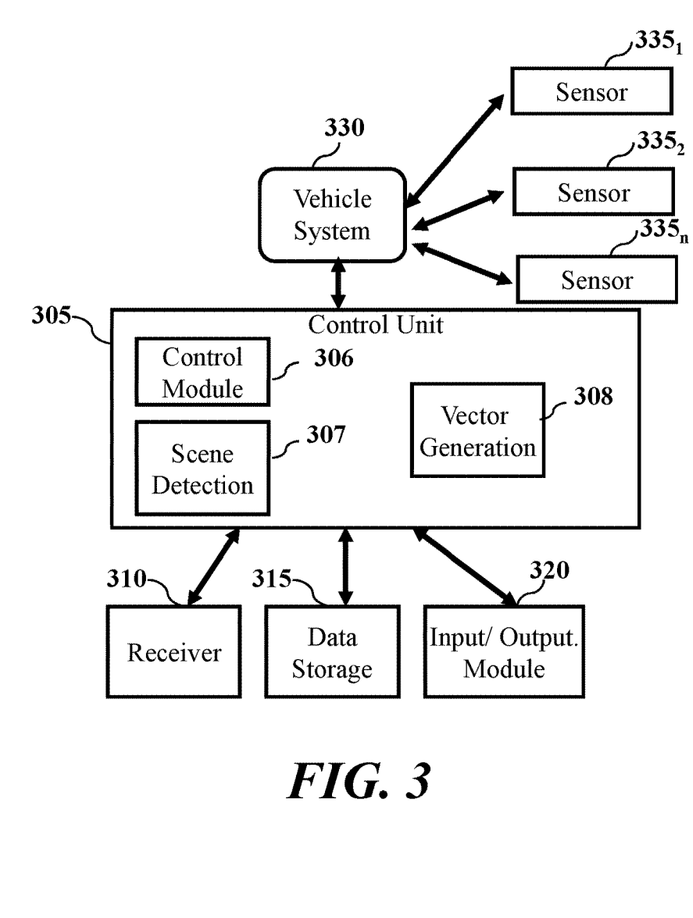
FIG. 3 depicts a graphical representation of a vehicle control unit according to one or more embodiments.

According to an exemplary embodiment, process 200 may include identifying significant scenario data based on a vector representation of a trained data set and vehicle sensor data from one or more sensors (e.g., sensors $335_{1\text{-}n}$ of FIG. 3). Receiving vehicle sensor data at block 205 can include receiving data from vehicle sensors including but not limited to an image sensor (e.g., video), radar sensor, LiDAR sensor, acceleration/motion sensor and vehicle sensors (e.g., wheel speed sensor, tire pressure monitoring system (TPMS) sensor, ABS sensor, yaw/pitch sensor, stability control sensor, etc.). Sensor data may be received by a control unit by way of a controller area network (CAN) bus of the vehicle. Sensor data received at block 205 may be used to run a scene detection operation at block 210.

In one embodiment, the scene detection operation at block 210 identifies received sensor data and a vector representation may be generated for sensors individually and/or in combination. In certain embodiments, a scene detection operation may be performed to identify sensor data that is outside of a normal or trained operating range. For vehicle handling, for example, one or more of throttle sensor output, braking controls (e.g., ABS braking system sensors), tire pressure, etc., may be detected for a period of time. When one or more of the sensors have a change in output associated with an event sensor data preceding, during and after the event may be captured. A significant scenario may be detected at block 220 when one or more sensor outputs exceed or differ from a trained data set. By way of example, for a vehicle traveling on at high speeds during highway driving, the scene detection operation may include trained data for a particular vehicle speed with braking, tire pressure and other sensor data to be in a relative range. When sensor data indicates a departure from expected bounds for the scenario, such as vehicle a being controlled or operated at speeds too high for exiting the highway as indicated by one or more of elevated tire pressure, increased breaking, vehicle sensor data may indicate a significant scenario where trained data does not provide acceptable operation of the vehicle. Because highway exits often differ, trained data for a vehicle may benefit from scenes and scenarios captured by the vehicle.

According to another embodiment, sensor data detected at block 210 may result in a significant scenario when the sensor does not provide an accurate representation. By way of example, one or more sensors of the vehicle may be configured for certain operating parameters, such as a cameras definition based on the number of pixels or frames detected. For certain driving scenarios, such as low speed driving, the camera resolution and frame rate may be acceptable for driving at low speeds, while higher speed operations may require increase resolution or rates of detection. Accordingly, a significant scenario may be detected at block 220 may relate to an indication of the sensors ability to provide data in addition one or more training parameters for the vehicle control unit. Outputting a scenario at block 230 can include providing sensor data in addition to the indication of the event. For camera devices, outputting scenario at block 230 can include transmitting image data captured and objects identified by the vehicle control unit as part of the scene detection operation.

According to one embodiment, when the scenario relates to a pattern of detected data, event significance may be related to departures in patterns or pattern types that are not trained. According to one embodiment, vehicle sensor data at block 205 relates to a pattern, such as roadway markers, or road width. Patterns may also relate to objects relative to a road, such as barriers or bicyclists. The scene detection operation at block 210 may detect the pattern from sensor data and a vector representation of the sensor data may be employed to characterize operation of the vehicle relative to the pattern. Significant scenarios may be detected at block 220 when received sensor data of the pattern changes. By way of example, roadway markers for a period of time, such as 100 yards (e.g., 300 m) that suddenly change or result in a lane shift. Similar examples include the presence of lane barriers and then a shift in position. Another example could be the sudden appearance of a lane barrier. With respect to movable or moving objects a significant scenario may be operating characteristics of another vehicle that appears to be swerving. Another example of the significant scenario may be the pattern of a motorcycle or bicyclist traveling in a pattern/expected trajectory that sudden shifts toward a vehicle of the control unit. In such an instance, one or more vehicle systems such as a stability control modules may generate a scenario that is not recognized and/or not trained.

According to one embodiment, process 200 may include identifying a significant scenario by determining familiarity for a current scene vehicle is operating in relative to a vehicle trained data set for at least one driving condition. A significant scenario may be detected at block 220 by characterizing when received sensor data of the pattern changes.

FIG. 3 depicts a graphical representation of a vehicle control unit according to one or more embodiments. According to one embodiment, a vehicle includes a control unit 305 which may be configured to interface with one or more vehicle components. According to one embodiment, control unit 305 may be configured to perform one or more processes and functions described herein, such as process 200 of FIG. 2. Control unit 305 may relate to a control unit of a vehicle navigation unit, advanced driver assistance system (ADAS) or autonomous driving (AD) system.

In an exemplary embodiment, control unit 305 includes one or more elements or modules for interfacing with vehicle components. FIG. 3 shows control unit 305 including a control module 306, scene detection module 307 and vector generation module 308. Control unit 305 may receive position data for a vehicle from receiver 310. One or more executable instructions and navigation data (e.g., map data) may be stored by data storage 320. Input output module 320 may be configured to interface one or more other devices including but not limited to network resources. Control unit 305 may be configured to communicate with a vehicle system 330, including an engine control unit (ECU).

According to one embodiment, control module 306 represents one or more functional and hardware elements of control unit 305 that may be configured to direct operation of the control unit. Control module 306 may be configured to receive and utilize a trained vehicle data set. Control module 306 may direct one or more communications to vehicle system 330, which may include output to one or more of a vehicle bus and electronic control unit configured to control vehicle operation (e.g., braking, lighted indicators, safety features, etc.).

According to one embodiment, scene detection module 307 represents one or more functional and hardware elements of control unit 305 that may be configured to analyze target objects and vehicle operations. Scene detection module 307 may identify one or more significant events.

According to one embodiment, vector generation module 308 represents one or more functional and hardware elements of control unit 305 that may be configured to generate a vector and one or more anomalies against the vector. Vector generation module 308 may estimate the familiarity of a trained vehicle set with a current driving scene or environment. Sensor module 308 may also receive one or more control signals for a sensor that is part of vehicle system 330 relating to the status of a filter.

According to one embodiment, the principles, processes and device configurations may be applied to one or more sensor packages. FIG. 3 is shown including sensors $335_{1-n}$ configured to provide data to vehicle system 330. According to one embodiment, sensors $335_{1-n}$ may relate to one or more sensors of a vehicle associated with control unit 305. Sensors $335_{1-n}$ may provide output to a CAN bus of vehicle system 330 which may also be received by control unit 305 by way of a CAN bus or other vehicle system.

Sensors of the vehicle can include one or more of an image sensor (e.g., video), radar sensor, LiDAR sensor, acceleration/motion sensor and vehicle sensors (e.g., wheel speed sensor, tire pressure monitoring system (TPMS) sensor, ABS sensor, yaw/pitch sensor, stability control sensor, etc.), throttle sensor, and vehicle sensor in general. Output of sensors $335_{1-n}$ may be provided as vehicle sensor data to control unit 305 for processing.

According to one embodiment, sensors $335_{1-n}$ may relate to one or more vehicle acceleration sensors and/or vehicle stability control sensors (e.g., traction control). Sensors $335_{1-n}$ may include a plurality of acceleration sensors (e.g., accelerometer) and sensors for yaw, pitch and steering angle. In certain embodiments, identifying a significant event may be related to the ability of a vehicle trained data set to control vehicle operation relative to a roadway or curve. As such, scoring may generate an objective value representing the ability of a traction control system of the vehicle to handle a roadway. For example, sensors $335_{1-n}$ may generate output indicating understeer or oversteer from one or more of sensors $335_{1-n}$. Sensors $335_{1-n}$ may include a vehicle accelerometer (e.g., single axis, multi-axis) and one or more yaw/pitch sensors to track vehicle displacement through a curve. In situations where the trained data set is used to operate the vehicle and/or employed by the traction control system, a significant event may be determined for understeer and/or oversteer.

Figure 4:
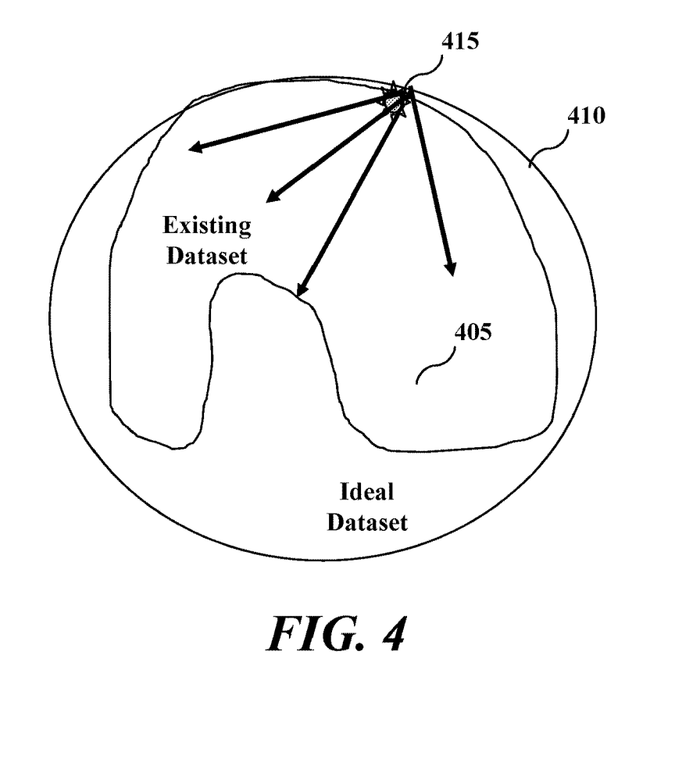
FIG. 4 depicts a graphical representation of a trained vehicle data set according to one or more embodiments.

FIG. 4 depicts a graphical representation of a trained vehicle data set according to one or more embodiments. According to one embodiment, a trained vehicle data set is a known training data set used to train algorithms that operate autonomous vehicles and assisted driving systems of various types. FIG. 4 provides an exemplary illustration of a trained vehicle data set relative to an ideal data set.

According to one embodiment, an ideal data set can be reached where most or all driving scenes are adequately handled. The ideal data set for a vehicle may depend on the sensors of the vehicle, sensing ability, sensor data, etc. Even with improved sensors, there is a need to assess the ability of a system to detect and handle objects and scenarios. In addition, there is a need to identify situations a vehicle training data set does not adequately address.

FIG. 4 illustrates a representation of a known or existing data set 405 relative to an ideal data set 410. Existing data set 405 may relate to a known data set including a known training data set used to train algorithms that operate autonomous vehicles of various types. Processes and operations discussed herein may generate a familiarity metric or vector, shown as vectors 415, using data captured by one or more local vehicle sensors or combined sensors, and subsequent real-time algorithms measuring scene statistics. In one embodiment, the familiarity of data set 405 is generated based on many possible attributes captured by the host vehicle and associated algorithms. According to one embodiment, exemplary attributes can include, but are not limited to: number of target objects, classification of target objects, size and shape of target objects, number of lanes, lane type, lane marker color, lane marker shape or dash type, vehicle state behavior such as sliding, vehicle location, environmental conditions that effect visibility of target objects and lanes. These attributes may be employed to describe the dimensions of a vector, or vectors 415, generated by a neural network that uses a technique of clustering known attributes of a known training data set. One or more vectors, such as vectors 415, may be used in a run time environment to detect anomalies against the vector. The described vector is the estimate of the run time algorithm's familiarity with the environment in which it is used. To describe the general use of the aforementioned vector, the vector is generated as part of a software release for an autonomous vehicle control system that describes the entire training set of data. In one embodiment, the vector is scored continually during run time in the autonomous vehicle control system as part of the perception engine. This scoring provides the method to identify significant or unfamiliar scenario data and flag or record associated data in a previously unmentioned data recorder.

Ideal data set 410 may represent a set of data that may not be achieved. Systems and configurations discussed herein may operate based on data set 405 that is known. An anomaly detection vector may be generated for data set 405 to describe the data set. Processes discussed herein provide a trigger mechanism that triggers an event or scenario that has not been presented in the data set 410.

Figure 5:
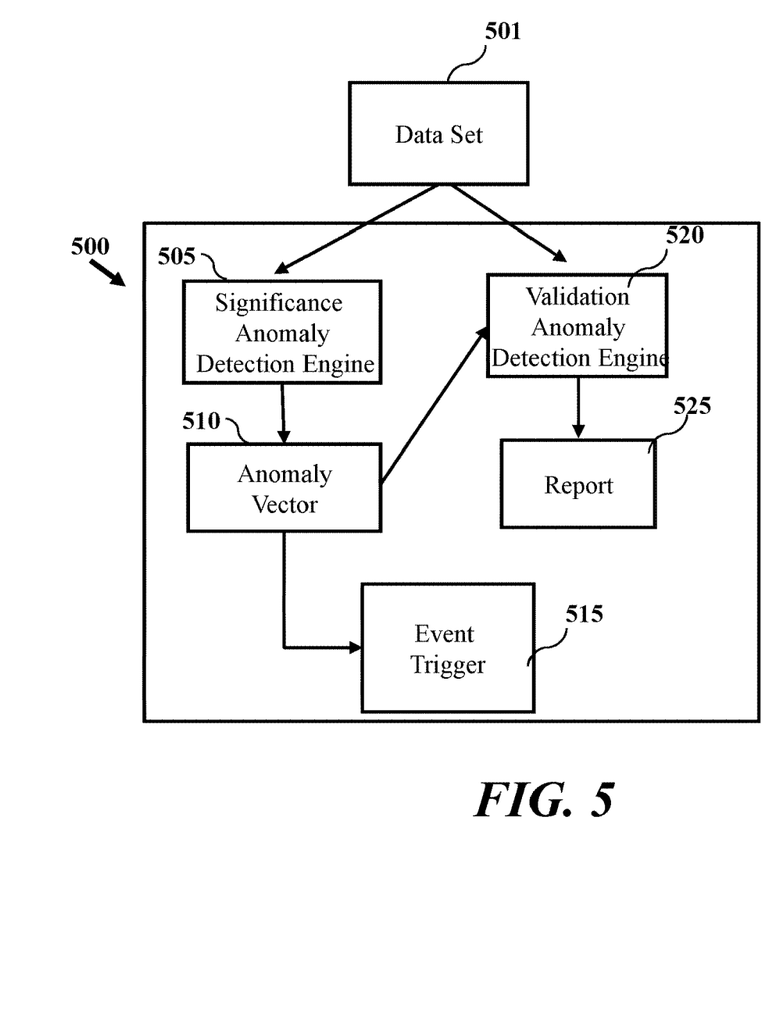
FIG. 5 depicts a graphical representation of control unit operations according to one or more embodiments.

FIG. 5 depicts a graphical representation of control unit operations according to one or more embodiments. Control unit operations can facilitate the automatic identification of new data that an existing assistive vehicle algorithm would be unfamiliar with. According to one embodiment, a vehicle control unit 500 may perform functions for at least one of significance anomaly detection and validation anomaly detection. Vehicle control unit 500 may be configured to receive a trained vehicle data set 501 from a data repository, such as a cloud repository. The vehicle data set may be provided to a vehicle to perform scene detection and/or other operations.

In one embodiment, vehicle control unit 500 includes a significance anomaly detection engine module 505 configured to perform a clustering method, such as K-means clustering, to approximate the "area" of the collected and annotated data set that is used to train the run time algorithm. A resultant vector, from anomaly vector block 510, is generated from clustering and is used to describe the dataset. The vector may be generated concurrently with the algorithm release for the run time system. In one embodiment, the vector is then used in a run time system to score the scenario based on one or more attributes. An anomaly that escapes the clustering described by the anomaly vector would trigger a flag at event trigger block 515 in a data collection system that describes an event. According to one embodiment, this event is significant to the existing data set 501 since the trained run time algorithm is not familiar with the scenario.

According to one embodiment, compiled events captured during the capture period are added to the resultant data set and cycled through the training process for the next algorithm release. The new data set is then approximated again to update the clustering of objects.

At block 520, validation anomaly detection engine receives the anomaly vector from block 510. According to one embodiment, the anomaly vector may be used by validation anomaly detection engine module 520 to assess the familiarity of data set 501 within instantaneous analysis of a scene. Validation anomaly detection engine module 520 can detect anomalies against the anomaly vector from block 510 and generate a report on the familiarity of the data set 501 with a scene, scenario, or vehicle sensor data.

Figure 6:
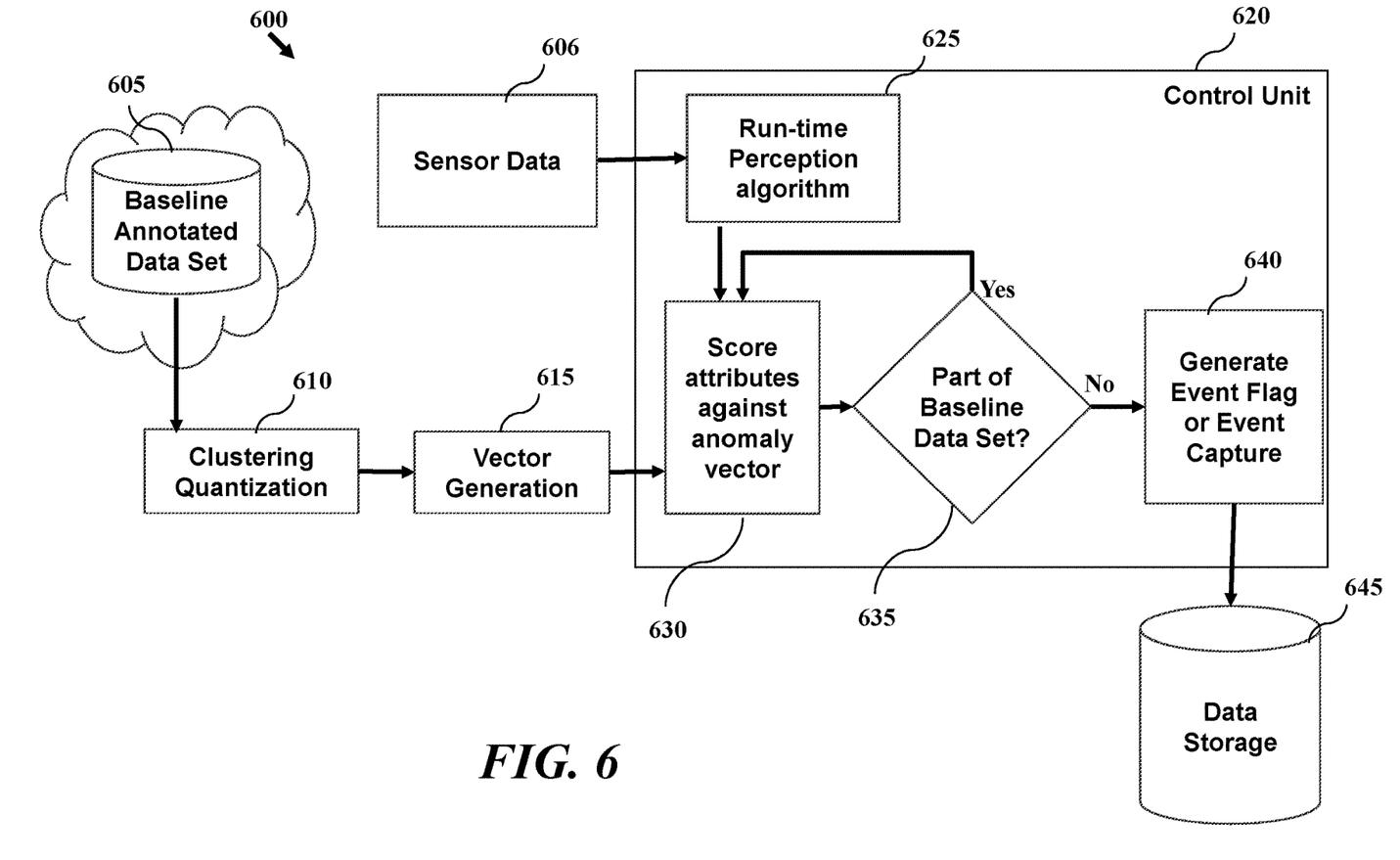
FIG. 6 depicts a graphical representation of operations relative to a known data set according to one or more embodiments.

FIG. 6 depicts a graphical representation of operations relative to a known data set according to one or more embodiments. Process 600 describes operations for a vehicle system according to one or more embodiments. In one embodiment, process 600 is directed to performing operations for significance anomaly detection. According to another embodiment, process 600 is directed to validation of an anomaly detection engine. Process 600 may relate to one or more control unit operations of a significance anomaly detection engine module and a validation anomaly detection engine module (e.g., significance anomaly detection engine module 505 and validation anomaly detection engine module 520 of FIG. 5).

According to one embodiment, baseline data set 605 including a plurality of object types and object attributes may be employed as a known training data to train algorithms of a vehicle assistance system, such as a scene detection operation. A clustering quantization operation is performed at block 610 for the baseline data set and a vector generation operation is performed at block 615 based on characteristics of the data clusters generated at block 610. The clustering quantization may include one or more operations to classify and annotate objects by type and attributes. As a result of clustering, objects having similar attributes may form clusters that may be analyzed by vector based modeling. Given a known data set, such as baseline data set 605, including a known training data set used to train algorithms that operate autonomous vehicles of various types, process 600 is configured to generate a familiarity metric or vector at block 615. One or more vectors may be generated describing the centroid of each cluster form block 610 and result in a representation that may be employed by a vehicle control unit to analyzed sensed data and/or the baseline data set 605. Operations at block 610 and 615 may be performed to describe the baseline annotated data set 605, such as whether or not the baseline data set includes data similar or capable of describing sensed vehicle data. The vector generated at block 615 may be used to identify object targets or vehicle operating conditions of significance. According to another embodiment, blocks 610 and 615 may be embodied as computer executable code that may be deployed to a vehicle for use in a driver assistance system. According to one embodiment, attributes are used to describe the dimensions of a vector generated at block 620 by a neural network using clustering of the known attributes at block 610 the training data set 605.

According to another embodiment, operations for anomaly detection may be provided by process 600. Using data captured by a local vehicle sensor or combined sensors at block 606 and subsequent real-time algorithms measuring scene statistics such as a perception algorithm at block 625, familiarity of the baseline data set may be determined. Process 600 includes scoring attributes against an anomaly vector at block 630. Scoring may provide one or more values, such as a percentage or value within a range identifying characterizing familiarity of the baseline annotated data set 605 with objects detected at block 625. Scoring may be based on many possible attributes captured by the host vehicle provided in sensor data 606 and associated algorithms performed at block 625. Exemplary attributes in one embodiment can include, but are not limited to: number of target objects, classification of target objects, size and shape of target objects, number of lanes, lane type, lane marker color, lane marker shape or dash type, vehicle state behavior such as sliding, vehicle location, environmental conditions that effect visibility of target objects and lanes. Scoring at block 630 can allow for identification of significant or unfamiliar scenario data to be flagged or record associated data in a data recorder or storage unit of a vehicle.

According to one embodiment, scoring at block 630 is performed based on a predetermined amount of variability. According to one embodiment, for objects detected optically, an acceptable amount of variability may be allowed for certain object classifications. Accordingly, scoring based on a first object class may employ a first amount of variability, while scoring a second object type may employ a second amount of variability, the second amount of variability different from the first. Thus, camera sensor data from block 606 identifying a pedestrian object may have a low threshold for determining significance, relative to signage which is usually associated with a limited set of pre-established set of objects and thus, have a higher threshold for significance. With respect to scoring sensor attributes, scoring may asses the divergence of sensor output relative to trained sensor ranges. In certain embodiments, scoring at block 630 is configured to assess a trained data sets ability to perceive a driving scenario based on sensor data 606. By way of example, a trained data set may provide a basis for one or more of presenting an indication, controlling a vehicle unit or activating a vehicle control system (e.g., active breaking, throttle control, etc.) based on sensor data 606 and vector generation 616. Scoring at block 630 can provide an indication of the trained data sets ability to handle sensed data. In one embodiment, scoring at block 630 can result in at least one of a percentage and/or value measurement of accuracy for the trained data set relative to sensor data 606. In certain embodiments, the determined score may be output with generated flags in order for updating a trained data set.

According to one embodiment, operations performed by control unit 620 employ a vector generated at block 615 in a run time environment to detect anomalies against the vector. The described vector is the estimate of the run time algorithm's familiarity with the environment in which it is used. To describe the general use of the aforementioned vector, the vector is generated as part of a software release for an autonomous vehicle control system that describes the entire training set of data. The vector is scored continually during run time in the autonomous vehicle control system as part of the perception engine.

At decision block 635, process 600 determines whether target objects that are detected are part of a baseline data set, such as baseline annotated data set 605. When objects are included in the dataset, scoring at block 630 can reflect the data sets familiarity with sensed target object. When the target objects are not part of the baseline data set, an event flag to identify a target object or an event capture to detect a segment of target objects may be generated at block 640. Process 600 may include outputting event flags and event capture of block 640 to a data storage unit 645 or network resource (e.g., server, cloud network) which may be used to annotate and/or update a baseline annotated data set 605. Event flags and event captures in data storage 645 may also be used to identify one or more of objects, object attributes and scenarios that are unique.

Figure 7:
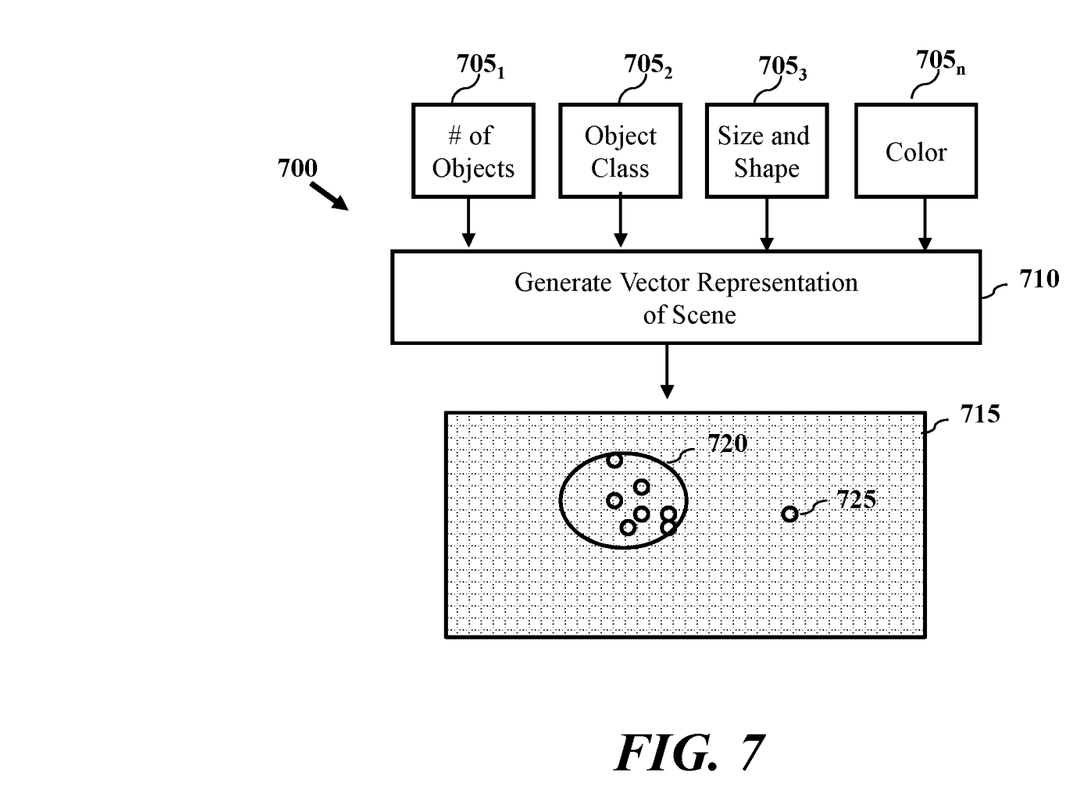
FIG. 7 depicts a graphical representation of object attributes according to one or more embodiments.

FIG. 7 depicts a graphical representation of object attributes according to one or more embodiments. According to one embodiment, a baseline data set may be characterized by attributes associated with object types and/or object characteristics. Process 700 describes clustering of object attributes by a vehicle control unit according to one or more embodiments.

Process 700 may be based on a plurality of attributes, such as attributes $705_{1-n}$. Attributes of process 700 include number of objects $705_1$, object class $705_2$, size and shape (e.g., dimension) $705_3$ and color $705_n$. It should be appreciated that other attributes may be employed. Attributes $705_{1-n}$ may also be based on the sensors of a vehicle. Using attributes $705_{1-n}$ a vector representation of a scene may be generated at block 710. The vector representation may be based on a vector data model representing detected objects by attributes, such as $705_{1-n}$, in a plurality of dimensions. The vector representation may be based on clusters of data representing similar types of objects. Data representation 715 represents an exemplary representation of data including a cluster 720 associated with a baseline data set. Cluster 720 represents data that is known, whereas data point 725 represents an anomaly or object target that is not similar to data point 725. Data point 725 is referred to as a point for illustration of a detected object or scene that lies beyond the object, object attributes and or scene parameters of the trained data set represented by cluster 720. According to one embodment, an anomaly vector determined for cluster 720 may be employed to identify data point 725.

According to one embodiment, the vector representation of a scene may be generated at block 710 using attributes $705_{1-n}$ may relate to a vector model representation a trained data sets ability to perceive and handle a detected object and/or scene. According to one embodiment, identifying a significant event may be based on the amount of divergence of a data point, such as data point 725, from a cluster, such as cluster 720, of the vector data model. As discussed herein, scoring of attributes may result in a value or representation of data point divergence from a cluster, such as cluster 720.

While this disclosure has been particularly shown and described with references to exemplary embodiments thereof, it will be understood by those skilled in the art that various changes in form and details may be made therein without departing from the scope of the claimed embodiments.

What is claimed is:

1. A method for identifying significant scenario data by a control unit of a vehicle, the method comprising:
   receiving, by a control unit, vehicle sensor data captured by at least one sensor of the vehicle, the vehicle sensor data generated by at least one perception sensor of a vehicle;
   running, by the control unit, a scene detection operation on the vehicle sensor data to derive a vector of target object attributes of the vehicle sensor data;
   comparing, by the control unit, the vector of target object attributes against a cluster of a vector data model of a trained vehicle data set; and
   identifying, by the control unit, significant scenario data based on a divergence between the vector of target object attributes and the cluster, wherein the significant scenario data identifies at least one target object of the vehicle sensor data.

2. The method of claim 1, wherein the vehicle sensor data includes at least one of image, radar, and LiDAR data for a detection zone of a driver assistance system of the vehicle.

3. The method of claim 1, wherein running the scene detection operation on the vehicle sensor data generates an annotated data set for target objects in real time based on the attributes of the trained vehicle data set, the trained vehicle data set providing a plurality of object types and object attributes.

4. The method of claim 1, wherein the cluster of the vector data model of the trained vehicle data set is generated by a k-means clustering algorithm.

5. The method of claim 1, wherein identifying the significant scenario includes determining that a target object not represented in the trained vehicle data set.

6. The method of claim 1, wherein identifying the significant scenario includes determining that the trained vehicle data set is unable to classify a target object.

7. The method of claim 1, wherein identifying the significant scenario includes determining familiarity of a target object relative to the trained data set based on at least one of a number of target objects, classification of target objects, size and shape of target object, object type, and object color.

8. The method of claim 1, wherein identifying the significant scenario includes determining at least one vehicle operation characteristic as an attribute relative to identification of a target object in at least one of a driver assistance system and autonomous driving system.

9. The method of claim 1, wherein identifying the significant scenario includes determining familiarity for a current scene of vehicle operation relative to a vehicle trained data set for at least one driving condition.

10. The method of claim 1, further comprising scoring, by the control unit, the vector on an ability of the scene detection operation to perceive target object attributes of the vehicle sensor data using the trained vehicle data set, and wherein the significant scenario is identified based on a score of the vector of target object attributes being below a predetermined threshold.

11. The method of claim 1, further comprising outputting the at least one target object of the vehicle sensor data.

12. A vehicle control unit comprising:
an input configured to receive vehicle sensor data; and
a control unit coupled to the input, wherein the control unit is configured to:
receive vehicle sensor data captured by at least one sensor of the vehicle, the vehicle sensor data generated by at least one perception sensor of a vehicle,
run a scene detection operation on the vehicle sensor data to derive a vector of target object attributes of the vehicle sensor data,
compare a vector representation for the scene detection operation with a familiarity vector of a trained vehicle data set, wherein the vector representation is a representation of effectiveness of the scene detection operation in identifying target object attributes of the vehicle sensor data,
identify significant scenario data based on the vector representation, wherein the significant scenario identifies at least one target object of the vehicle sensor data,
add the significant scenario data to a resultant data set, and
update a clustering of the trained vehicle data set based on the resultant data set.

13. The vehicle control unit of claim 12, wherein the vehicle sensor data includes at least one of image, radar, and LiDAR data for a detection zone of a driver assistance system of the vehicle.

14. The vehicle control unit of claim 12, wherein running the scene detection operation on the vehicle sensor data generates an annotated data set for target objects in real time based on the attributes of a trained vehicle data set, the trained vehicle data set providing a plurality of object types and object attributes.

15. The vehicle control unit of claim 12, wherein comparing the vector representation includes performing a clustering operation for target objects of the vehicle sensor data using the trained vehicle data set to generate a vector data model for the vehicle sensor data, the vector data model characterizing ability of the trained vehicle set to perceive target objects of the vehicle sensor data.

16. The vehicle control unit of claim 12, wherein identifying the significant scenario includes determining that a target object is an unidentified object.

17. The vehicle control unit of claim 12, wherein identifying the significant scenario includes determining that the trained vehicle data set is unable to classify a target object.

18. The vehicle control unit of claim 12, wherein identifying the significant scenario includes determining familiarity of a target object relative to the trained data set based on at least one of a number of target objects, classification of target objects, size and shape of target object, object type, and object color.

19. The vehicle control unit of claim 12, wherein identifying the significant scenario includes determining at least one vehicle operation characteristic as an attribute relative to identification of a target object in at least one of a driver assistance system and autonomous driving system.

20. The vehicle control unit of claim 12, wherein the vehicle control unit is further configured to score the vector representation on an ability of the scene detection operation to perceive target object attributes of the vehicle sensor data using the trained vehicle data set, and wherein the significant scenario is identified data based on a score of the vector representation below a predetermined threshold.

* * * * *

UNITED STATES PATENT AND TRADEMARK OFFICE
CERTIFICATE OF CORRECTION

Page 1 of 1

PATENT NO. : 11,087,144 B2
APPLICATION NO. : 16/156357
DATED : August 10, 2021
INVENTOR(S) : Aaron Thompson et al.

It is certified that error appears in the above-identified patent and that said Letters Patent is hereby corrected as shown below:

In the Claims

In Claim 10:
On Line 31, insert -- , by the control unit, -- after the word "identified" and before the word "based."

In Claim 20:
On Line 49, insert -- by the control unit -- after the word "identified" and remove -- data -- before the word "based."
On Line 50, add -- being -- before the word "below."

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*